March 18, 1941.   F. CISLAK   2,234,962
THREAD CUTTING DEVICE
Filed May 19, 1939   3 Sheets-Sheet 2

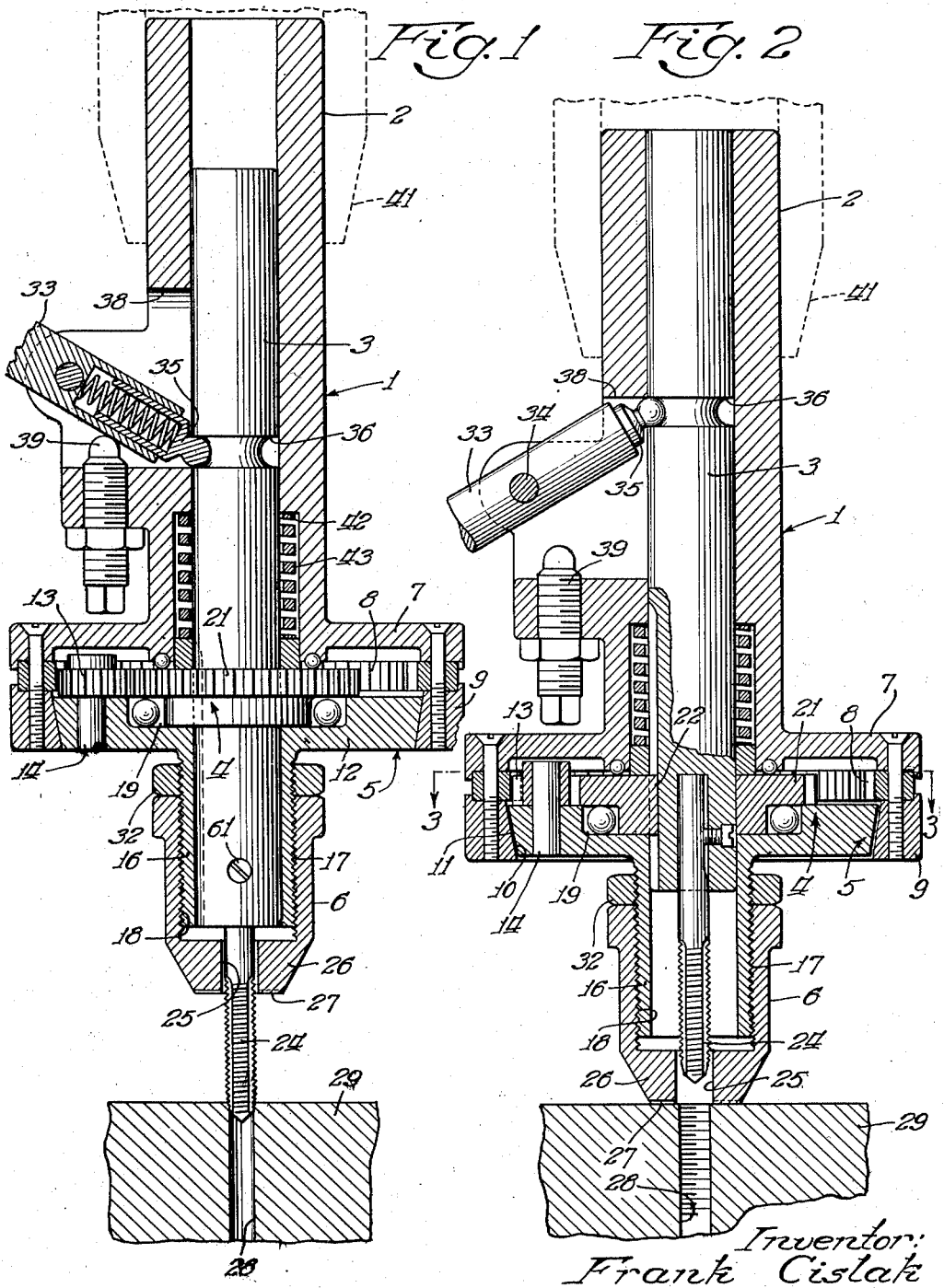

Inventor:
Frank Cislak

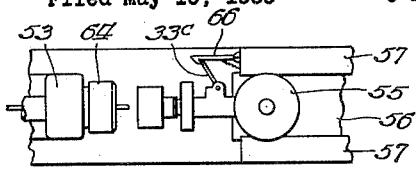
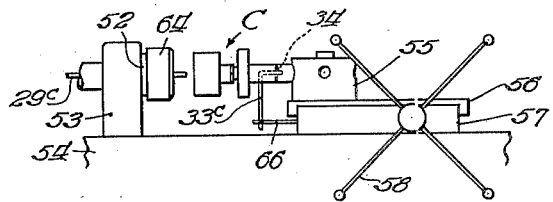
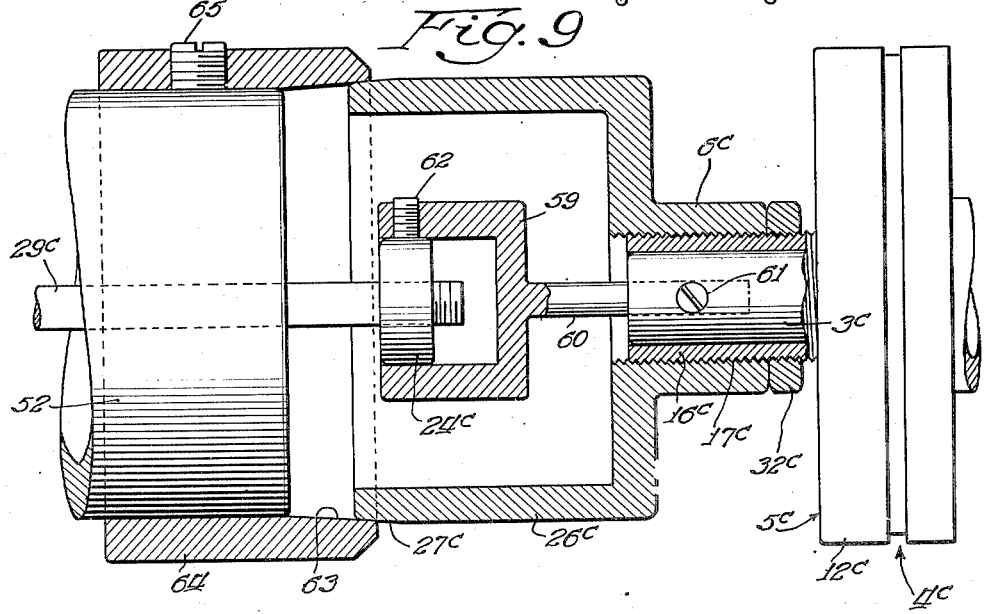
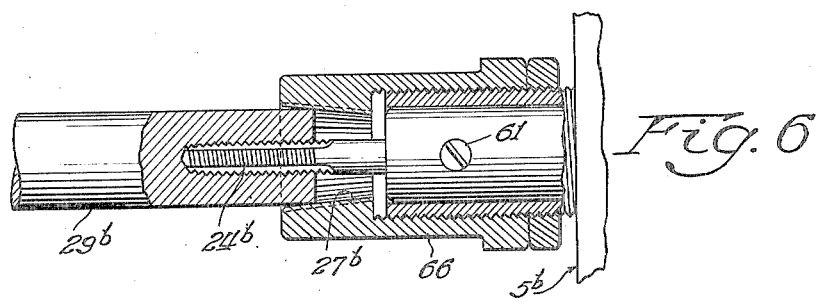

Patented Mar. 18, 1941

2,234,962

UNITED STATES PATENT OFFICE 2,234,962

THREAD CUTTING DEVICE

Frank Cislak, Berwyn, Ill., assignor of one-fourth to Frank Lane, Mt. Pleasant, Iowa, one-fourth to John M. Binding, Manistee, Mich., and one-fourth to Lewis D. Ross, Chicago, Ill.

Application May 19, 1939, Serial No. 274,555

15 Claims. (Cl. 10—136)

This invention relates to tapping and threading devices and has as its general object to provide a device of this type which embodies means, automatically made operative at the end of a thread forming operation, for reversing the drive from the driving member to the tool, so as to unthread the tool from the work.

The invention contemplates a thread forming device which may be embodied in drill presses, screw machines, lathes and machines of a similar nature, and adapted to form either internal threads (tapping) or external threads (threading). The term "thread forming" is used herein as a generic term including both of these operations.

A more specific object of the invention is to provide an automatically reversing thread forming device wherein the rotational speed of the tool driving withdrawal under reverse drive is greater than the speed of the tool during the cutting operation under forward drive.

Another object of the invention is to provide an automatically reversing thread forming device in the form of a self contained unit that may be attached to a drill press, screw machine, lathe or the like.

A further object is to provide an improved automatically reversing thread forming device wherein adjustment for depth of tapping or threading may be effected quickly and easily without regard to the size or length of the tap or die, while the device remains mounted in the machine during a period of use.

A further object is to provide an automatically reversing thread forming device wherein the tool carrying spindle is adapted to be retracted into the driving member as a result of the unthreading action, and is provided with means for detaining it in its fully retracted position after complete separation of the tool from the work, whereby to allow removal of the work without further separation of the device from the work. In this aspect, the invention further contemplates the return of the tool spindle to its projected, operating position by the application of external force thereto, as for example by manipulation of a lever.

Other objects, the advantages and uses of the invention will become apparent after reading the following specification and claims and after consideration of the drawings forming a part of the specification wherein:

Fig. 1 is a vertical sectional view of a tapping device constructed in accordance with my invention as the parts appear during initial operation of the tap;

Fig. 2 is a view, similar to Fig. 1, illustrating the tapping device with the parts as they would appear immediately following the withdrawal of the tap;

Fig. 6 is a fragmentary view partly in section of a modified form of the invention as applied to a screw machine;

Fig. 7 is a plan view of a turret lathe embodying another modification of the invention;

Fig. 8 is a side elevation of the same; and

Fig. 9 is a detail axial sectional view of the form of the invention shown in Figs. 7 and 8.

Figure 3:
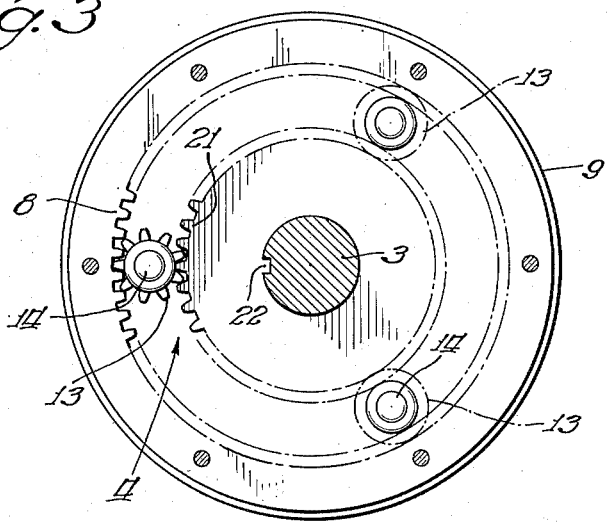
Fig. 3 is a sectional view along the line 3—3 of Fig. 2.

As an illustration of one form in which the invention may be embodied, I have shown in Figs. 1-4 inclusive, a portable thread forming device which may be used in machine shops and on production lines and which is capable of immediate transfer from one machine to another. The device comprises, in general, a casing 1 having a tubular shank 2, a tool spindle 3 mounted for rotation and axial movement within the casing 1, a reverse gear transmission 4 of the planetary type, operatively interposed between the casing 1 and the spindle 3, a friction clutch 5 operable normally to lock out the transmission 4 during tapping operation, and an automatic control for the transmission and lockout clutch, in the form of an adjustable sleeve 6 adapted to contact the work when the tap has penetrated the work to the required depth, and to release the lockout and shift the transmission into reverse drive as a result of axial thrust received from the work.

The body casing 1 may be formed at its outer end to provide a housing 7 for the planetary transmission 4 and to support, as shown, the internal ring gear 8 of the planetary transmission system. There is also secured to the casing 1 on the outer side of the ring gear 8 an annular member 9 having a conical inner friction face 10 and forming one of the operating elements of the cone friction clutch 5. The cooperating friction face 11 of the clutch 5 is formed on the carrier 12 of the planetary gear system upon which carrier three planet pinions 13 are mounted by means of spaced stub shafts 14, each pinion being in permanent mesh with the ring gear 8, as shown in Fig. 3.

The carrier 12 is further formed with a central and axially extending tubular portion 16, surrounding the tap spindle 3, which is provided with external screw threads 17 adapted to receive complementary screwthreads 18 on the inner wall of the axially adjustable sleeve 6. A central depression 19 formed in the innermost wall of the carrier 12 serves to accommodate the hub portion of a central or sun gear 21 having teeth in permanent mesh with the pinions 13 and completing the gear assembly of the planetary system. The sun gear 21 is feathered upon the tap spindle 3 as indicated at 22 in order that the spindle 3 may move longitudinally along the axis of the assembly, as during the tapping operation.

In the drawings, I have shown a tap 24 secured in the end of the tap spindle 3 by means of a set screw 61 and in Fig. 1, the tap is shown extending through a central aperture 25 in the outer abutment portion 26 of the sleeve 6. It is intended that the sleeve 6 shall be turned upon the screw threads 17 until, with the parts as shown in Fig. 1, the distance between the abutment surface 27 of the sleeve portion 26 and the entry portion of the tap 24 is equal to the depth of the thread to be tapped. Stated in other words, the desired depth of thread to be cut, as in the bore 28 of the work 29 (Fig. 1) is equal to the distance between the adjacent surface of the work and the abutment surface 27 when the device is lowered for tap entry. Means for locking the adjustment sleeve 6 against rotation relative to the carrier assembly may comprise a lock nut 32 engageable with the threads 17 upon the tubular portion 16 of the carrier.

Figure 4:
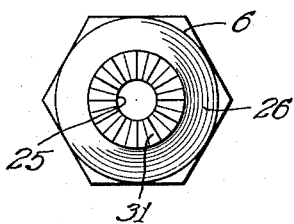
Fig. 4 is an end view of the adjustable retraction control sleeve.
Figure 5:
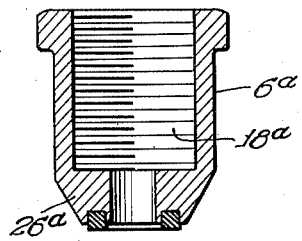
Fig. 5 is a longitudinal sectional view of a modified form of the sleeve illustrated in Fig. 4.

Inasmuch as reaction of the reverse gear drive, when in operation, must be borne by the planet carrier 12 in its engagement with a fixed object, such as the work 29, I prefer to form the abutment surface 27 with radial serrations 31 as best shown in Fig. 4.

Longitudinal travel of the tap spindle 3 may be confined between two limits as indicated in Figs. 1 and 2 respectively, the one limit representing tap position prior to entry and the other limit, tap position after automatic withdrawal. These limits are determined by a first order lever 33 pivotally mounted at 34 upon the casing 1 and having within that arm extending toward the spindle 3 a spring pressed plunger 35, the outer end of which is disposed within an annular groove 36 in the outer wall of the spindle. The plunger 35 being under constant thrust tends to move away from the pivot of the lever thus providing an over-center action as between the lever and spindle with the result that the spindle will constantly be urged axially toward one of its limits of travel as determined by engagement of the lever arm with the stop surface 38 or adjustable stop pin 39. The outer end of the lever 33, shown broken away in Figs. 1 and 2, is exposed for manual or automatic manipulation in order that the spindle may be urged to its opposite limit of travel after having passed the center of travel during operation.

In use, my improved thread-forming device may be set in the driven spindle 41 of any power driven machine such as a screw machine or drill press as indicated in Fig. 1. At this time, the lever 33 will have been set to run the tap spindle with its tap 24 to the outer limit of its travel and the adjustment sleeve 6 turned and subsequently set by the back nut 32 so that the entry portion of the tap extends beyond the abutment surface 27 of the sleeve a distance equal to the depth of thread to be cut.

At this time, with the surface 27 free of contact with the work 29, the clutch 5 will be engaged under the axial force applied between the head of the carrier 12 and a shoulder 42 formed in the base of the body casing 1 by a compression spring 43 acting upon the carrier through the sun gear 21 as shown. With the friction surfaces 10 and 11 of the clutch 5 engaged, the elements of the planetary drive are locked against relative movement and the sun gear 21 must rotate with the body casing 1 and carry the tap spindle therewith.

The tapping operation may now progress by advancing the driven spindle 2 relatively toward the work 29 and when the tap has progressed, for example, into the bore 28, a depth sufficient to cause the abutment surface 27 to contact the work, continued thrust upon the driven spindle 2 relatively toward the work will cause the carrier 12 to be moved inwardly against the action of the spring 43 thus to disengage the friction clutch 5. At this time, the pressure of the abutment surface 27 against the surface of the work 29 will be sufficient to cause the carrier 12 to remain stationary relative to the work and thereupon the planetary gearing to drive the tap spindle in a reverse direction at a speed greater than the speed of the driven spindle 2 and therefore greater than tap speed during the thread cutting operation.

As the tap spindle 3 with its tap 24 is thus reversely driven, the tap will be caused to move outwardly of the work and after the groove 36 of the tap spindle has passed the plane of the lever pivot 34, the tap will be under a withdrawal tension tending to move it into the position shown in Fig. 2, which position it will assume immediately upon retraction from the tapped bore 28.

The work may then be removed, the driven spindle 41 of the power machine retracted to its initial position, and a fresh piece of work inserted under the tap. The tap spindle may then be projected to its operating position by manual application of force to the lever 33, and a new operation started.

The invention is equally adaptable to a screw machine, wherein the work, for example, a rod 29b, is fed through a suitable guide tube (not shown) into engagement with the rotating tool, such as the tap 24b. Here the sleeve 66, instead of engaging the work at its end, is provided with a conical mouth 27b, which may be serrated, and the end of the rod 29b is adapted to enter the mouth 27b and to engage the same so as to arrest the rotation of the sleeve 66. The construction and operation of the invention in this modified form is otherwise identical to that of the form previously described, a portion of the planetary mechanism being indicated at 5b.

The invention may also be applied as illustrated in Figs. 7, 8 and 9, to a machine lathe wherein the work, as for example, the rod 29c, is clamped in and revolved by a chuck 52 suitably journalled in a bracket 53 mounted on the bed 54. The conventional turret 55, mounted on a slide carriage 56 which in turn is slidably mounted in ways 57 on the bed 54, is adapted to advance the automatic threading tool C upon the rod 29c, in response to movement imparted to the carriage 56 by a conventional manual operator 58.

The spindle 3c, in this form of the invention, carries a die holder 59, the shank 60 of which is secured in the end of the spindle by a set screw 61. The die 24c is secured in the holder 59 by a set screw 62.

The control sleeve 6c, which is threaded at 17c upon the nipple 16c of the carrier 12c, and locked in any adjusted position thereon by a lock nut 32c as in the form of the invention shown in Figs. 1 and 2, is formed at its end with an enlarged skirt 26c, having an extension conical friction face 27c adapted when the rod 29c has been threaded the predetermined distance to be engaged by the interior conical friction surface 63 of a collar 64 secured as by a set screw 65 upon the end of the chuck 52. The clutch 5c of the planetary unit 4c which is identical to that shown in Figs. 1 and 2, will, during the gradual feeding of the tool onto the work, restrain the die 24c against rotation. When, however, the skirt 26c engages the rotating collar 64, it will be arrested so that further advance of the turret will cause the clutch 5c to be released, and, simultaneously, will be rotated so as to cause the planet carrier to rotate, thereby causing the planet gears to be moved orbitally and to transmit to the sun gear the rotation imparted to them by the stationary ring gear. Thus the die 24c will be rapidly unthreaded from the end of the rod 29c.

The lever 33c, controlling the shifting of the tap spindle 3c from the retracted position to which it is pushed by the unthreading of the die 24c, is adapted to be engaged by a hook 66 mounted in one of the ways 57, as the turret is advanced for a new threading operation after having been retracted at the end of the previous operation. As the turret is advanced, the lever 33c will be restrained by hook 66 until it passes dead center, whereupon the spindle 3c will spring to its position wherein the die 24c is projected forwardly into operative position for the ensuing threading operation. Before the completion of the threading operation, the lever 33c will spring past the hook 66 so as to be free to shift to its alternate position during the unthreading operation.

It is to be understood that the invention may be embodied in other specific forms in addition to those particularly disclosed in the foregoing description and the accompanying drawings, and the true scope of the invention is to be determined by reference to the appended claims.

I claim:

1. A tapping device comprising a drive member having a shank adapted to be received in the driven spindle of a screw machine, drill press or the like, a tap supporting spindle mounted for axial and rotary movement relative to said drive member, a reverse gear transmission interposed between said drive member and said driven spindle, a reverse speed control member adapted to contact the adjacent surface of the work when the tap has entered said work a predetermined distance, and means normally locking said reverse gear transmission against operation for causing said drive member, transmission and tap spindle to rotate as a unit, said parts being so arranged that contact of said control member with said work during continued downward pressure of said driven spindle causes said reverse gear locking means to be ineffective and said transmission to drive said tap spindle in a reverse direction.

2. A tapping device comprising a drive member, a tap spindle mounted for axial and rotary movement relative to said drive member, a reverse drive transmission of the planetary type interposed between said drive member and said tap spindle, means normally locking the elements of said transmission against relative movement whereby to effect a direct drive between said drive member and said spindle, and means responsive to a predetermined limit of axial movement of said drive member in the direction of the work for rendering said locking means ineffective thus to cause said tap to be driven in the opposite direction.

3. The combination defined in claim 2 wherein the ratio of said reverse gear transmission is such as to reverse drive said tap spindle at a speed greater than the speed of said drive member and hence the speed of said tap driving its cutting operation.

4. An automatically reversing thread forming device comprising a drive member, a tool spindle mounted for axial and rotary movement relative to said drive member, a reverse drive planetary transmission operatively interposed between said drive member and said spindle, including control means adapted at the end of the threading operation, to contact the work so as to arrest the rotation of one of the planetary elements and thereby to rotate said tool spindle in reverse, and means rendered inoperative by said contacting of the work, for locking the planetary elements against rotation relative to each other, whereby to effect a direct forward drive through said transmission to said tool spindle.

5. An automatically reversing thread forming device comprising a tubular drive member adapted to be advanced toward a piece of work, a tool spindle journalled and axially slidable therein, a planetary reverse drive transmission operatively interposed between said drive member and spindle, control means associated with one of the elements of said transmission adapted, when the tool has completed its operation upon the work, to engage the work so as to arrest the rotation of said transmission element and thereby to rotate said tool spindle in reverse, and means, associated with said transmission element, adapted to lock the transmission elements against relative rotation during operating advance of the device, whereby to effect a direct forward drive through said transmission from said drive member to said tool spindle, said locking means being adapted to be rendered inoperative by the contact of said control means with the work.

6. An automatically reversing thread forming device comprising a tubular drive member adapted to be advanced for operating on a piece of work, a tool spindle journalled and axially slidable therein, a planetary reverse drive transmission including a ring gear carried by said drive member, a sun gear mounted on said tool spindle, planet gears, and a planet carrier, control means carried by said planet carrier and adapted to engage the work, when the tool has completed its operation of the carrier, thereby to cause the transmission to transmit reverse rotation to said tool spindle, and means associated with said carrier, adapted to lock the carrier to the ring gear during the operation on the work, whereby to effect a direct forward drive through said transmission from said drive member to said tool spindle, said locking means being adapted to be rendered inoperative by the contact of said control means with the work.

7. An automatically reversing thread forming device comprising a drive memper adapted to be advanced for operating on a piece of work, a tool spindle coaxially associated with said drive member for rotating and axial movement relative thereto, a planetary reverse drive transmission including a ring gear carried by said drive member, a sun gear mounted on said tool spindle, planet gears, and a planet carrier, control means carried by said planet carrier and adapted to engage the work, when the tool has completed its operation thereon so as to arrest the rotation of the carrier, thereby to cause the transmission to transmit reverse rotation to said tool spindle, and means associated with said carrier, adapted to lock the carrier to the ring gear during the operation on the work, whereby to effect a direct forward drive through said transmission from said drive member to said tool spindle, said locking means being adapted to be rendered inoperative by the contact of said control means with the work.

8. An automatically reversing thread forming device as defined in claim 7, wherein said locking means comprises friction clutch elements associated with the carrier and ring gear respectively, having conical friction faces adapted to be disengaged by axial retraction of the carrier relative to the ring gear.

9. An automatically reversing thread forming device as defined in claim 7, wherein the carrier is axially retractible relative to the ring gear, and the locking means comprises clutch elements associated with the carrier and ring gear respectively, adapted to be disengaged by such retraction, and yielding means for urging said clutch elements into engagement with each other.

10. An automatically reversing thread forming device as defined in claim 7, wherein the carrier is axially retractible relative to the ring gear, and the locking means comprises clutch elements associated with the carrier and ring gear respectively, adapted to be disengaged by such retraction, and a coil spring encircling said spindle under compression between said drive member and the sun gear, adapted to transmit through said sun gear to the carrier, pressure for yieldingly maintaining said clutch elements in engagement, and a thrust bearing interposed between said sun gear and the carrier.

11. An automatically reversing thread forming device as defined in claim 5, wherein said control means includes two parts, the work contacting part being axially adjustable relative to the other part for varying the length of the working movement of the tool.

12. An automatically reversing thread forming device as defined in claim 7, wherein the control means comprises a tubular part into which the tool holding end of the spindle extends, and a work engaging cap threaded upon said tubular part for adjustment of the length of the working movement of the tool.

13. An automatically reversing thread forming device as defined in claim 4, including an over center spring latch device adapted to latch the spindle in the retracted position to which it is moved by the unthreading operation.

14. An automatically reversing thread forming device as defined in claim 4, including an over center spring latch device adapted to latch the spindle in the retracted position to which it is moved by the unthreading operation, and manual means for moving said latch device forwardly past dead center for resetting the spindle in advanced, operating position.

15. A device of the class described, comprising a driving member and a driven member, said members being associated with two elements of a three element differential mechanism, means for locking the elements of said differential mechanism against relative rotation during the work cycle of said driven member so that said driving and driven members and said differential mechanism will rotate as a unit, and control means including an element associated with said driven member which is automatically operative upon the completion of the work cycle of said driven member to render said locking means inoperative and for controlling the rotation of the third element of said differential mechanism to reverse the direction of rotation of said driven member.

FRANK CISLAK.